United States Patent
Tseng et al.

(10) Patent No.: US 7,849,340 B2
(45) Date of Patent: Dec. 7, 2010

(54) DATA TRANSMISSION SYSTEM AND LINK STATE MANAGING METHOD THEREOF USING TURN-OFF ACKNOWLEDGEMENT AND ELECTRICAL IDLE WAITING TIMEOUTS

(75) Inventors: Wen-Yu Tseng, Taipei (TW); Jin-Liang Mao, Taipei (TW)

(73) Assignee: Via Technologies, Inc., Taipei (TW)

( * ) Notice: Subject to any disclaimer, the term of this patent is extended or adjusted under 35 U.S.C. 154(b) by 1090 days.

(21) Appl. No.: 11/429,941

(22) Filed: May 9, 2006

(65) Prior Publication Data

US 2006/0262839 A1  Nov. 23, 2006

Related U.S. Application Data

(60) Provisional application No. 60/683,313, filed on May 23, 2005.

(30) Foreign Application Priority Data

Nov. 1, 2005  (TW) .............................. 94138229 A

(51) Int. Cl.
*G06F 1/32* (2006.01)
(52) U.S. Cl. .................. 713/323; 710/104; 713/320
(58) Field of Classification Search .............. 713/320, 713/323; 710/8, 104
See application file for complete search history.

(56) References Cited

U.S. PATENT DOCUMENTS

| 4,763,296 | A | 8/1988 | Gercekci |
| 4,872,110 | A | 10/1989 | Smith et al. |
| 6,122,690 | A | 9/2000 | Nannetti et al. |
| 6,694,390 | B1 * | 2/2004 | Bogin et al. .................. 710/53 |
| 7,188,263 | B1 | 3/2007 | Rubinstein et al. |
| 7,287,096 | B2 * | 10/2007 | Wunsch ...................... 709/248 |
| 7,320,080 | B2 | 1/2008 | Solomon et al. |
| 7,383,457 | B1 | 6/2008 | Knight |
| 2003/0123486 | A1 * | 7/2003 | Lacey, III .................. 370/485 |
| 2004/0128576 | A1 | 7/2004 | Gutman et al. |
| 2004/0268169 | A1 | 12/2004 | Bashford et al. |
| 2005/0086549 | A1 * | 4/2005 | Solomon et al. ............ 713/320 |
| 2005/0097378 | A1 | 5/2005 | Hwang |

OTHER PUBLICATIONS

PCI Express Base Specification, Revision 1.0a, Apr. 15, 2003.*
PCI Express Base Specification, Revision 1.0a, PCI-SIG, Apr. 15, 2003.
PCI Express Base Specification, Rev. 1.0a, PCI-SIG, Apr. 15, 2003, pp. 201, 267, 276-278.

* cited by examiner

*Primary Examiner*—Albert Wang
(74) *Attorney, Agent, or Firm*—Bacon & Thomas, PLLC

(57) ABSTRACT

A peripheral component interconnect express (PCIE) data transmission system and link state managing method thereof are disclosed. The PCIE data transmission system includes an upstream device, a downstream device and a link. When the link is in a first link state, the downstream device and the upstream device transmit data normally via the link. When the upstream device outputs a turn-off signal to the downstream device, a time period is counted. The downstream device outputs an acknowledging signal to response the turn-off signal. If the upstream device does not receive the acknowledging signal within the time period, the link is transited from the first link state to second link state to remove the power of the link.

23 Claims, 4 Drawing Sheets

DATA TRANSMISSION SYSTEM AND LINK STATE MANAGING METHOD THEREOF USING TURN-OFF ACKNOWLEDGEMENT AND ELECTRICAL IDLE WAITING TIMEOUTS

This application claims the benefits of U.S. provisional application Ser. No. 60/683,313, filed May 23, 2005, and Taiwan application Serial No. 94138229, filed Nov. 1, 2005, the subject matter of which are incorporated herein by reference.

BACKGROUND OF THE INVENTION

1. Field of the Invention

The invention relates in general to a data transmission system, and more particularly, to a peripheral component interconnect (PCI) Express data transmission system and link state managing method thereof.

2. Description of the Related Art

Along with technology progress, PCI, originally a mainstream PC interface, has gradually become too narrow in transmission bandwidth to meet the requirement of processors and output/input devices in the future. Therefore, industrials supply a new generation of PCI Express as a standard field input/output bus for various operation platforms in the future. The main feature of PCI Express lies in the increase of performance where the single transmission rate can reach 2.5 GHz. The transmission rate can be further improved by increasing the number of lanes, such as using 4 lanes to reach 4 times of transmission rate.

The advanced configuration and power interface (ACPI) defines the power states in various situations, which are called device power states or D-states, and PCI Express further defines the power states of the links among devices, which are called link states or L-states. Besides, the link states have also corresponding relationship with the device power states.

The device power state Do represents the device operates in a normal state. When the devices are set in the power state D0, the link among the devices is set in a link state L0, L0s or L1.

The device power states D1 and D2 are not defined clearly. Generally speaking, these two states save less electric power but maintain more device states. The D1 and D2 states correspond to the link state L1.

The device power state D3 implies a power off state, which includes D3cold and D3hot states. When a device is in the D3cold state, it implies the main power is not supplied to the device. When the device is in the D3hot state, it implies the main power is still supplied to the device. When the power state of devices is D3cold, if some auxiliary power is supplied to the devices, the link among the devices corresponds to a link state L3. The device power state D3hot corresponds to the link state L1 or L2/L3 ready.

The link state L0 defines the link among devices is in normal operation. During the data transmission of the link among devices, if there exists temporary idle periods, the system can enter the link state L0s to reduce power consumption.

When the link among devices is set in the link state L1, the devices have no operation requirement, and thus the required electrical power for the link among the device can be reduced. In the meanwhile, no clock signal is triggered and the phase locked loop (PLL) is also paused.

The link states L2 and L3 are both power-off states. The link state L2 has auxiliary power but the link state L3 has none.

SUMMARY OF THE INVENTION

The invention provides a PCI Express data transmission system and link state managing method thereof. A time period is considered in the invention. If the upstream device does not receive an acknowledging signal within the time period, the link is transited from a first link state to a second link state so as to remove the power of the link.

The invention provides a data transmission system including an upstream device, a downstream device and a link. When the link is in a first link state, the downstream device and the upstream device normally transmit data via the link. When the upstream device outputs a turn-off signal to the downstream device, a time period with programmable is counted. The downstream device outputs an acknowledging signal to response the turn-off signal. If the upstream device does not receive the acknowledging signal within the time period, the link is transited from the first link state to a second link state to remove the power of the link.

The invention provides a method for managing link state of a data transmission system. The data transmission system includes an upstream device, a downstream device and a link, and the downstream device and the upstream device transmit data via the link. The method includes sending out a turn-off signal to the downstream device and counting a time period. Then transiting the link from a first link state to a second link state to remove power of the link when an acknowledging is not received within the time period.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
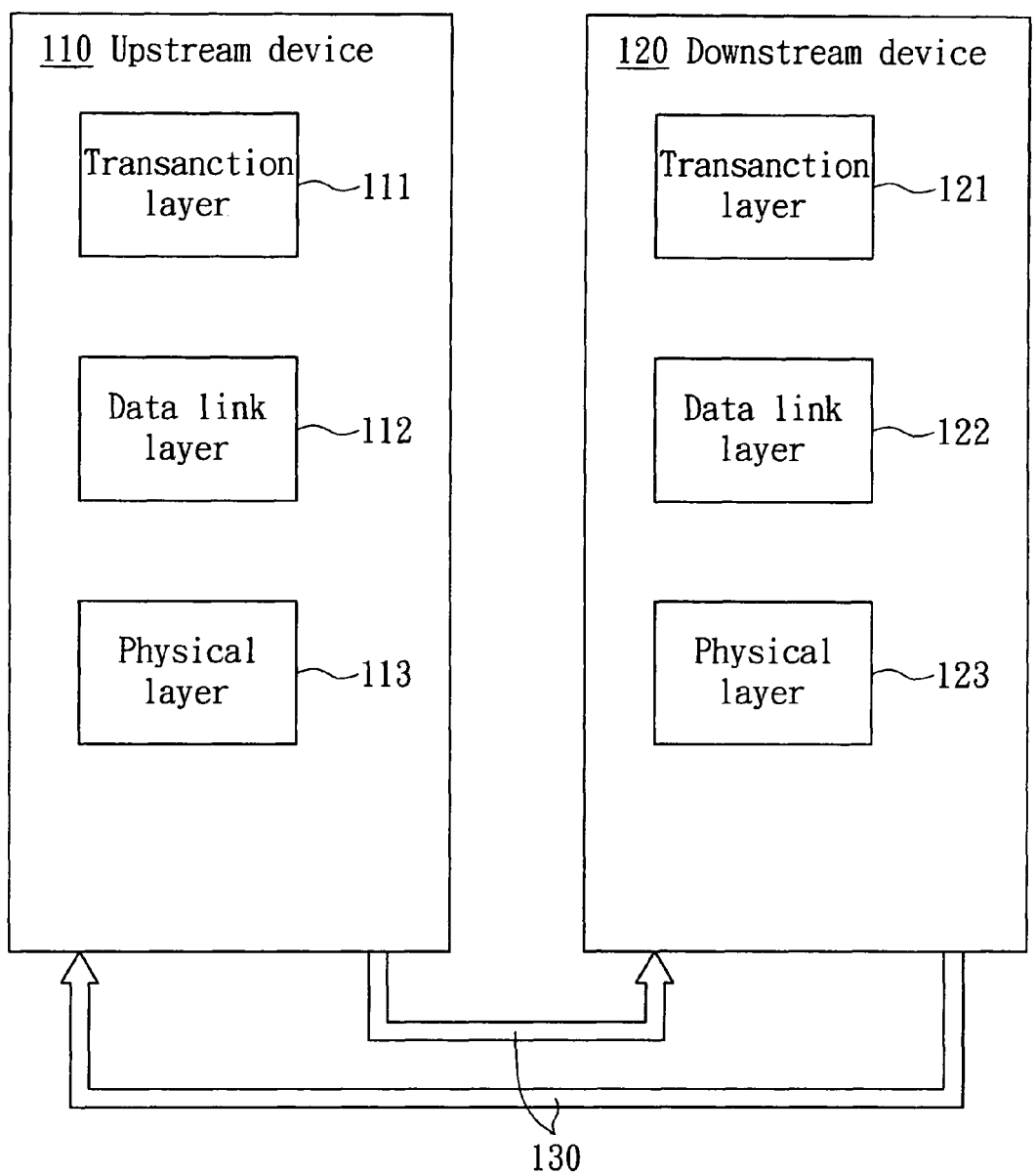
FIG. 1 is a block diagram of a PCI Express link system according to a preferred embodiment of the invention.

Referring to FIG. 1, a block diagram of a PCI Express data transmission system according to the invention is shown. The PCI Express data transmission system 100 includes an upstream device 110, a downstream device 120 and a link 130. The link 130 is electrically connected between the upstream device 110 and the downstream device 120.

The upstream device 110 includes a transaction layer (TL) 111, a data link layer (DLL) 112 and a physical layer (PHY) 113. The transaction layer 111 generates and transmits data packets to the data link layer 112, or receives data packets from the data link layer 112. The transaction layer 111 also manages the flow control among the transaction layer 111 and devices. The data packets received or generated by the transaction layer 111 are regarded as transaction layer packets (TLPs).

The data packets transmitted between the data link layer 112 and the physical layer 113 regarded as data link layer packets (DLLPs). The data link layer 112 receives the data packet and then provides the transaction layer packet to the transaction layer 111. Or the data link layer 112 receives the transaction layer packet outputted from the transaction layer 111 and then outputs the data packet to the physical layer 113. The data link layer 112 can further error detecting for stably transmitting packets as performing the above-mentioned operation.

The physical layer 113 takes charge of transmitting packets via the link 130 between the upstream device 110 and the downstream device 120. The physical layer 113 receives packets from the downstream device 120 and then outputs data link layer packets (DLLPs) to the data link layer 112 via the link 130.

The downstream device 120, similar to the upstream device 110, includes a transaction layer 121, a data link layer 122 and a physical layer 123. The operation of each layer is similar to those of the upstream device 110, and thus any detail is not necessarily given here.

Figure 2:
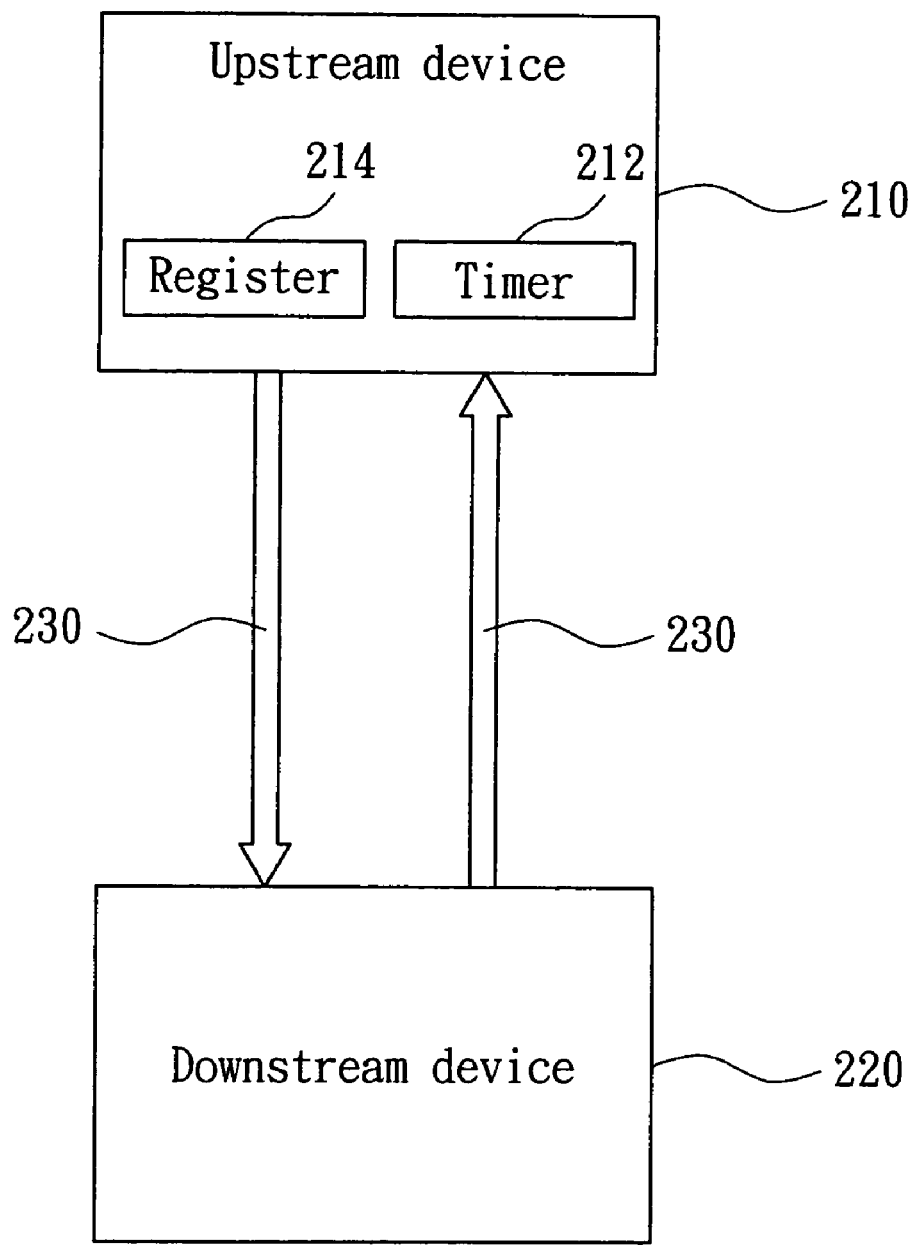
FIG. 2 is a block diagram of a PCI Express data transmission system according to a preferred embodiment of the invention.

Referring to FIG. 2, a block diagram of a PCI Express data transmission system according to the invention is shown. The PCI Express (PCIE) data transmission system 200 includes an upstream device 210, a downstream device 220 and a link 230. The upstream device 210 includes a timer 212 and a register 214. The link 230 connected between the upstream device 210 and the downstream device 220. When the link 230 is in L0 state, data are normally transmitted between the upstream device 210 and the downstream device 220.

When the link 230 is transited from L0 state to L2 or L3 state, the upstream device 210 sends out a turn-off signal to the downstream device 220 and the downstream device 220 responses an acknowledging signal to the upstream device 210 to remove the power of the link 230.

However, the link 230 can be transited from L0 state to L2 or L3 state only when the upstream device 210 receives the acknowledging signal from the downstream device 220. If the acknowledging signal is not sent out, the upstream device 210 will continuously waiting and the link 230 cannot be transited to L2 or L3 state. As a result, deadlock or abnormal situation occurs.

Figure 3:
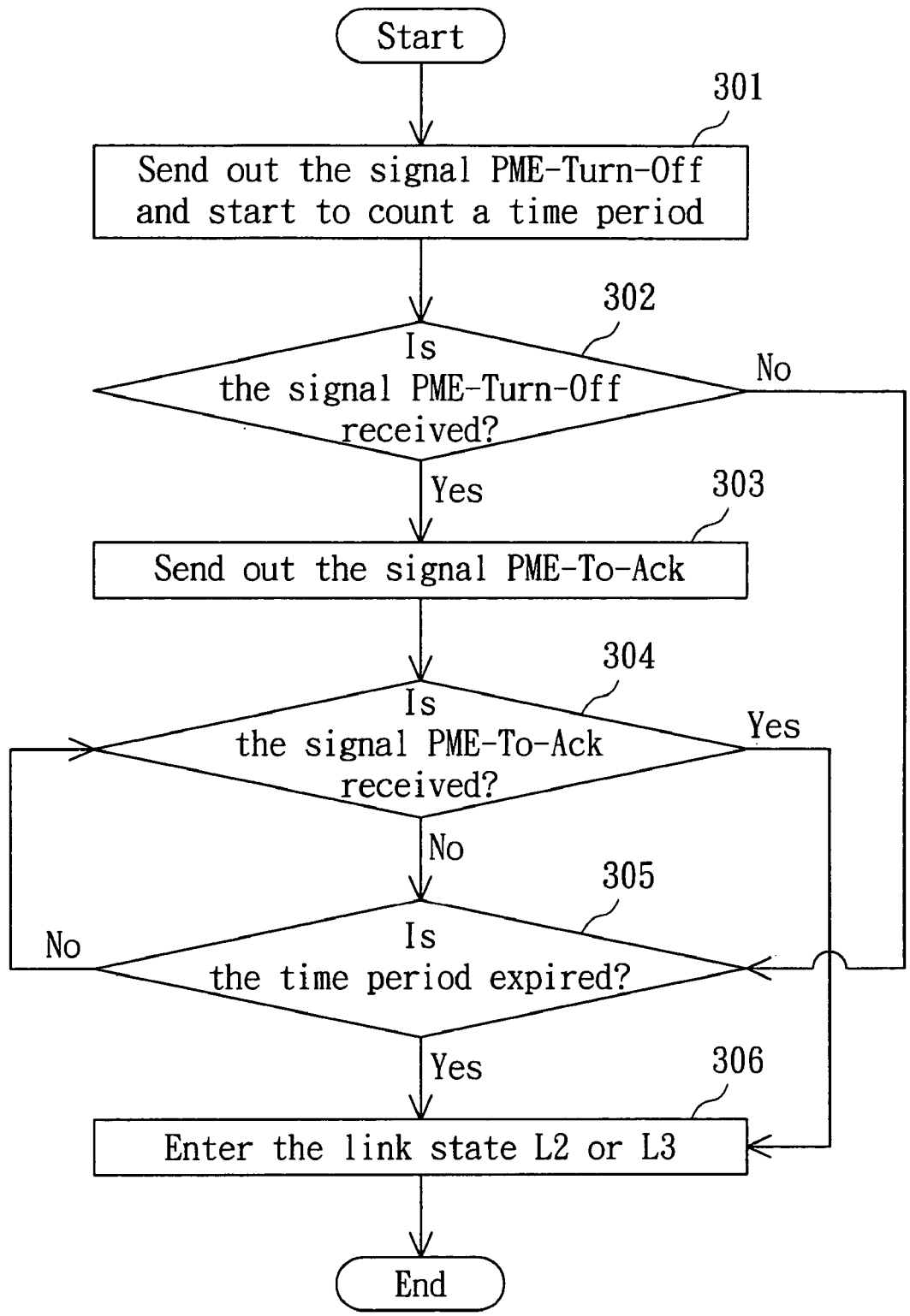
FIG. 3 is a flow chart of a method for managing link state of a PCI Express data transmission system according to a preferred embodiment of the invention.

Referring to FIG. 3, a flow chart 300 of a method for managing link state of a PCI Express data transmission system according to the invention is shown. The link state managing method is applied to the above-mentioned PCIE data transmission system 200.

In step 301, the upstream device 210 outputs a turn-off signal, PME-Turn-Off, to the downstream device 220 via the link 230 when the link 230 of the PCIE data transmission system 200 is transited from a first link state (ex. L0 state) to a second link state (ex. L2 or L3 state). In the meanwhile, a time period starts to count when the turn-off signal, PME-Turn-Off is sent out, wherein the time period is changeable.

Next, in step 302, the downstream device 220 determines whether the turn-off signal, PME-Turn-Off, is received. If the downstream signal 220 receives the turn-off signal, PME-Turn-Off, the downstream signal 220 outputs an acknowledging signal, PME-To-Ack, to the upstream device 210 in response to the turn-off signal, PME-Turn-Off, as shown in step 303. The downstream device 220 waits for the turn-off signal, PME-Turn-Off, until the time period is expired. If the time period is expired, the link 230 would be transited to the L2 or L3 state without receiving the turn-off signal, PME-Turn-Off, (step 306).

Next, in step 304 and step 305, the upstream device 210 determines whether the acknowledging signal, PME-To-Ack, is received. The upstream device 210 waits for the acknowledging signal, PME-To-Ack until the time period is expired. The link 230 would be transited to the L2 or L3 state when the acknowledging signal, PME-To-Ack, is received or even when the time period is expired but the acknowledging signal, PME-To-Ack, is not received (step 306).

Table 1 shows an example setting of the time period according to the invention, the above-mentioned time period is programmable via setting the register 214, RPMTOFF, in the upstream device 210. For example, when the register RPMTOFF is set to be 001, the time period is 256 µs, thus the upstream device 210 counts for 256 µs when the turn-off signal, PME-Turn-Off, is sent out. If the upstream device 210 does not receive the acknowledging signal, PME-To-Ack, from the downstream device 220 after 256 µs, the link 230 is transited from L0 state to L2 or L3 state so as to remove the power of the link 230.

TABLE 1

| Register RPMTOFF[2:0] | Predetermined Duration |
|---|---|
| 000 | 128 µs |
| 001 | 256 µs |
| 010 | 512 µs |
| 011 | 1 ms |
| 100 | 2 ms |
| 101 | 4 ms |
| 110 | 8 ms |
| 111 | 10 ms |

Figure 4:
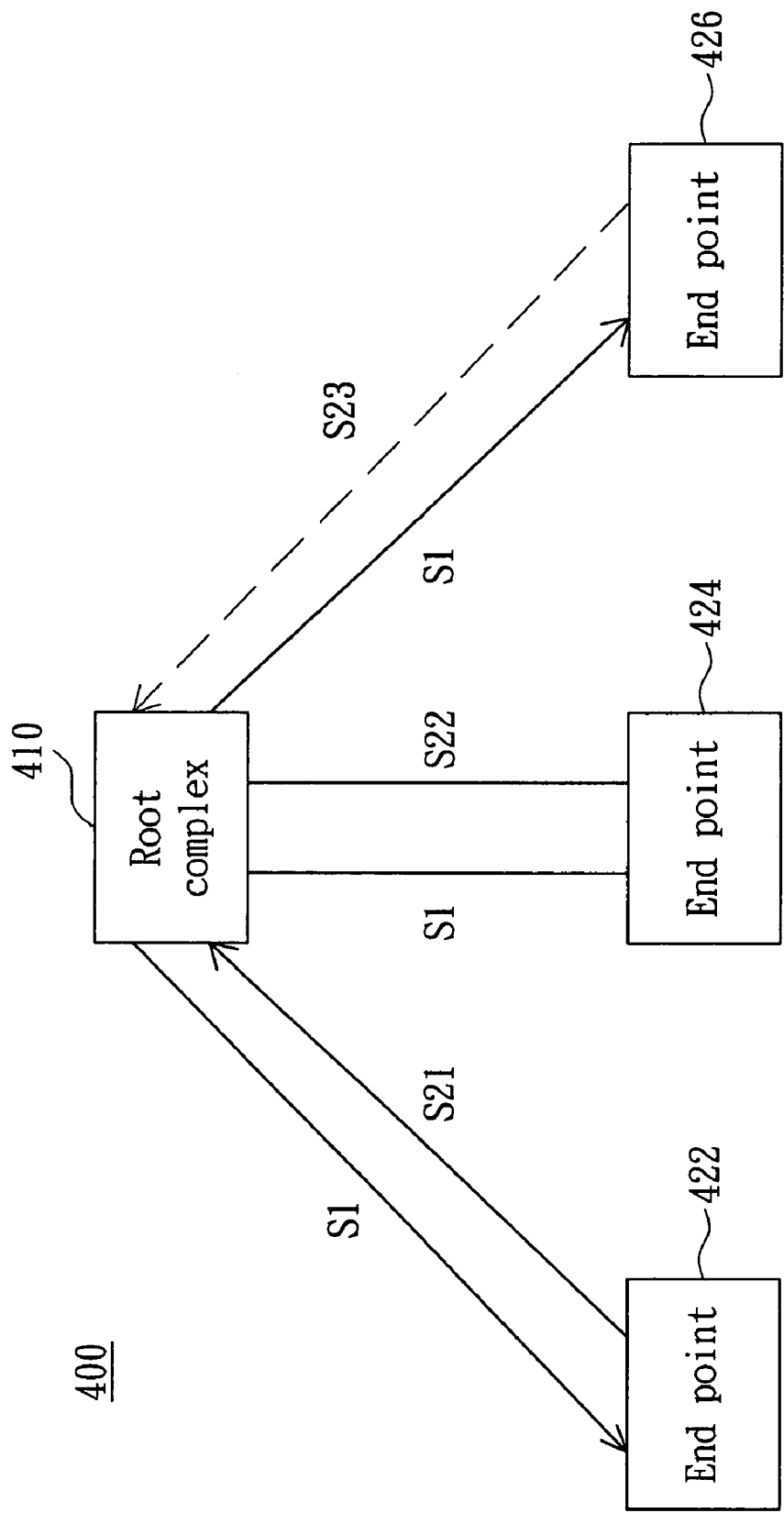
FIG. 4 is a schematic diagram of the operation between a root complex (RC) and end points.

Referring to FIG. 4, a schematic diagram 400 of the operation between a root complex (RC) and end points is shown. For example, in FIG. 2, the upstream device 210 is a root complex and the downstream device 220 is an end point, such as a video card or an internet card. In FIG. 4, the root complex 410 sends out a turn-off signal S1 to the end points 422, 424 and 426 in a broadcast way. The end point 422 outputs an acknowledging signal S21 to the root complex 410 after receiving the turn-off signal S1. The PCIE data transmission system 400 managing the link state of the link connected between the root complex 410 and the end point 422 from L0 state to L2 or L3 state. Similarly, the end point 424 outputs an acknowledging signal S22 to the root complex 410 after receiving the turn-off signal S1 and then the link connected between the root complex 410 and the end point 424 is transited from L0 state to L2 or L3 state.

The link 330 connected between the root complex 410 and the end point 426 is directly transited from L0 state to L2 or L3 state when the time period is expired no matter the acknowledging is not send out or the turn-off signal S1 is not received. That is to say, because the time period is counting when the turn-off signal, PME-Turn-Off, is sent out. If the downstream device doesn't receive the turn-off signal, PME-Turn-Off, or if the acknowledging signal, PME-To-Ack, is send out to response the turn-off signal, PME-Turn-Off, but is not received by the upstream device, the acknowledging signal, PME-To-Ack, would be received within the time period and the link 230 would be always transited to L2 or L3 state due to the time period is expired. Therefore, the deadlock or abnormal situation can be avoided In the PCI Express data transmission system and link state managing method thereof disclosed by the above-mentioned embodiment of the invention, a programmable time period is considered in the invention. If the upstream device has not received the acknowledging signal from the downstream device when the time period is expired, it will be regarded that the acknowledging signal has been received and the link state is changed accordingly. Therefore, it can be avoided that the deadlock or abnormal situation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmission system, comprising:
an upstream device;
at least one downstream device; and
a link, connected between the upstream device and the downstream device, wherein the link is in a first link state;
wherein when the upstream device outputs a turn-off signal to the downstream device, a first time period is counted, if the upstream device does not receive an acknowledging signal from the downstream device to response the turn-off signal within the first time period, the link is then transited from the first link state to a second link state to remove power of the link;
wherein the downstream device outputs a power entering signal to the upstream device and when the upstream device outputs a power acknowledging response signal to response the power entering signal, a second time period is counted; if the link has not yet entered an electrical idle state when the second time period is expired, the downstream device re-outputs the power entering signal.

2. The data transmission system according to claim 1, wherein when the upstream device receives the acknowledging signal within the first time period, the link is then transited from the first link state to the second link state according to the acknowledging signal.

3. The data transmission system according to claim 1, the upstream device and the downstream device normally transmit data via the link when in the first link state.

4. The data transmission system according to claim 1, wherein if the downstream device does not receive the turn-off signal within the first time period, the link is then transited from the first link state to the second link state.

5. The data transmission system according to claim 1, wherein the first link state is L0 state.

6. The data transmission system according to claim 1, wherein the second link state is L2 state or L3 state.

7. The data transmission system according to claim 1, wherein the upstream device is a root complex (RC), and the downstream device is an end point (EP).

8. The data transmission system according to claim 1, wherein the first time period and the second time period are adjustable.

9. The data transmission system according to claim 1, wherein the upstream device comprises a register for storing at least one time period.

10. The data transmission system according to claim 1, wherein the upstream device comprises a timer for counting the first time period and the second time period.

11. The data transmission system according to claim 1, wherein the system is a peripheral component interconnect express (PCIE) data transmission system.

12. The data transmission system according to claim 1, wherein when the second time period is expired and the link enters to the electrical idle state, the upstream device stops data transmission and the link further enters to a third link state.

13. The data transmission system according to claim 12, wherein the third link state is L1 state.

14. A method for managing link state of a data transmission system, the data transmission system comprising an upstream device, a downstream device and a link, the downstream device and the upstream device transmitting data via the link, the method comprising:
sending out a turn-off signal to the downstream device and counting a first time period, wherein the time period is programmable;
transiting the link from a first link state to a second link state to remove power of the link when an acknowledging signal is not received within the time period;
outputting a power entering signal to the upstream device;
outputting a power request acknowledging signal to the downstream device in response to the power entering signal and counting a second time period; and
re-outputting the power entering signal if the link does not enter to an electrical idle state when the second time period is expired.

15. The method according to claim 14, wherein the method further comprises outputting the acknowledging signal to the upstream device when receiving the turn-off signal.

16. The method according to claim 14, wherein the method further comprises when the upstream device receives the acknowledging signal within the first time period, transiting the link from the first link state to the second link state to remove the power of the link according to the acknowledging signal.

17. The method according to claim 14, wherein the method further comprises transiting the link from the first link state to the second link state if the turn-off signal is not received within the first time period.

18. The method according to claim 14, wherein data is normally transmitted via the link when in the first link state.

19. The method according to claim 14, wherein the first link state is L0 state.

20. The method according to claim 14, wherein the second link state is L2 state or L3 state.

21. The method according to claim 14, wherein the method is applied to a peripheral component interconnect express (PCIS) data transmission system.

22. The method according to claim 14, further comprising:
stopping data transmission and transiting the link to a third link state when the link enters to the electrical idle state before the second time period is expired.

23. The method according to claim 22, wherein the third link state is L1 state.

* * * * *